Jan. 5, 1971     L. HORNBOSTEL, JR     3,553,079
MOLDING APPARATUS

Filed Dec. 7, 1967     3 Sheets-Sheet 1

INVENTOR.
LLOYD HORNBOSTEL, Jr.
BY Frank J. Jordan
ATTORNEY

Jan. 5, 1971  L. HORNBOSTEL, JR  3,553,079
MOLDING APPARATUS

Filed Dec. 7, 1967  3 Sheets-Sheet 2

INVENTOR.
LLOYD HORNBOSTEL, Jr.
BY
Frank J. Jordan
ATTORNEY

Jan. 5, 1971     L. HORNBOSTEL, JR     3,553,079
MOLDING APPARATUS
Filed Dec. 7, 1967     3 Sheets-Sheet 3
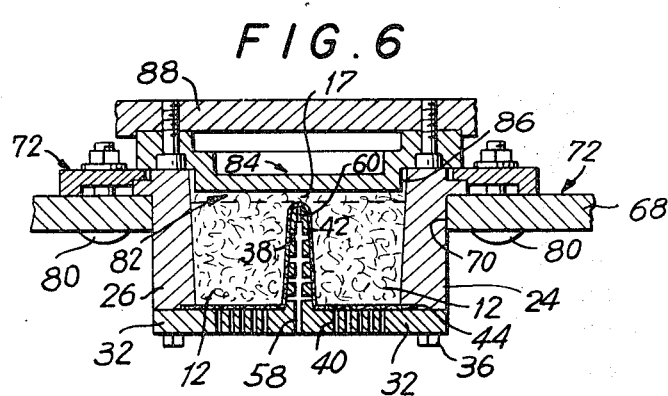
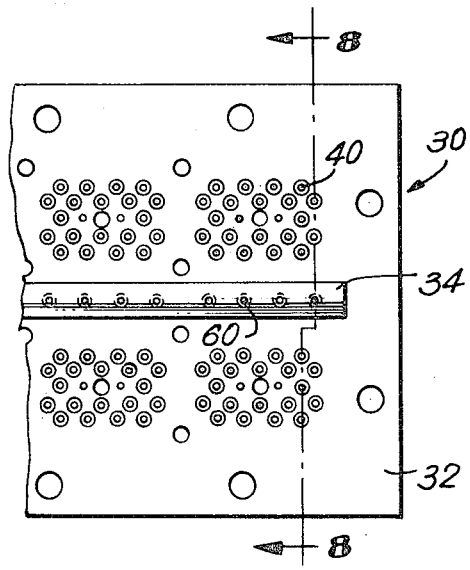
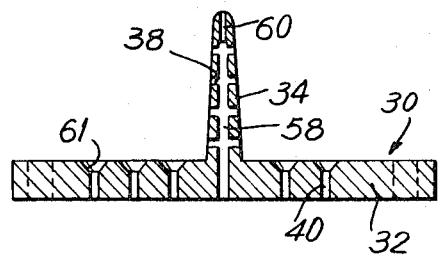
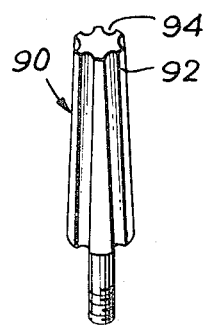
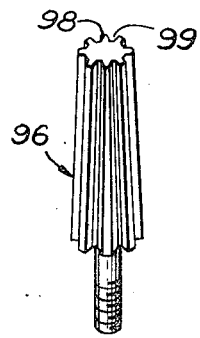
INVENTOR.
LLOYD HORNBOSTEL, Jr.
BY *Frank J. Gordon*
ATTORNEY United States Patent Office 3,553,079
Patented Jan. 5, 1971

3,553,079
MOLDING APPARATUS
Lloyd Hornbostel, Jr., Beloit, Wis., assignor to American Can Company, New York, N.Y., a corporation of New Jersey
Filed Dec. 7, 1967, Ser. No. 688,873
Int. Cl. D21j 7/00
U.S. Cl. 162—383
9 Claims

ABSTRACT OF THE DISCLOSURE

In an apparatus for forming molded pulp articles, a forming mold having at least a partial foraminous forming surface is adapted to mold an article consisting of a plurality of planting units or blocks separated at one end and joined to one another by a common web of pulp material at the other end, said molded article having a low-bulk density and porosity adapting it to be used as a plant growth medium.

BACKGROUND OF THE INVENTION

This invention relates to molding apparatus, particularly for molding fibrous, synthetic plant growth media into articles which may be used for growing plants and for other horticultural uses. Traditionally, plants such as geraniums, poinsettias, chrysanthemums, tomatoes, and the like, are started from cuttings or seeds planted in greenhouse propagation benches, flats, pots, or similar containers filled with a propagation medium such as sand or peat and perlite. More recently, synthetic plant growth media have been used successfully in place of soil for germination of seeds and propagation of plants. For example, a known synthetic plant growth medium is disclosed in U.S. patent application Ser. No. 651,094, filed June 26, 1967, now Pat. No. 3,467,609. The growth medium therein disclosed comprises polymer-modified cellulous fibers supplemented by fiber-bonding materials and plant nutrients. This medium is adaptable to being formed into various shapes by pulp-molding or slushed pulp-molding techniques, and the present invention relates to forming molds for molding this medium into useful shapes for use in horticulture.

One known method of forming molded pulp articles consists generally of immersing a suction or forming mold into a slurry of pulp fibers while suction is applied in order to form a body of pulp substantially in the shape of the desired article. The forming mold is then withdrawn from the slurry, and suction is generally continued to compact the deposited fibers while exhausting residual slurry liquid therefrom. Thereafter, the molded article may be pressed in place on the forming mold by a pressing plate for the purpose of further compacting the fibers and expelling additional slurry liquid. The article is then dried by any one of a variety of methods and transferred to an extractor plate by means generally involving suction against the article through ports in the extractor plate and the simultaneous application of air or other gas pressure through the suction ports of the forming mold.

According to the present invention, a forming mold, adaptable for use as a part of the overall molding process just described, has a mold cavity in which there is adapted to be molded an article having a plurality of planting units, blocks or the like joined to one another. Each planting unit or block in the article is configured to encompass a mass of pulp material adapted to receive roots as they grow from a plant in various directions. Accordingly, the molded article herein is distinguished from uniform, thin-walled articles (e.g., plates, trays) more commonly associated with pulp molding. The article is made in one piece so that it may be conveniently used for starting plant growth during the growing period for a plurality of plants and can later be severed into individual plant units for repotting or field transplanting.

In molding articles of the type described above, it is desirable to avoid stratification of the fibers and to achieve suitable density and homogeneity of the pulp throughout the article. Stratification of the fibers impairs the integrity of the block in that it will tend to split along planes of stratification. Void spaces, loosely packed spots, or weak areas are to be avoided, particularly in susceptible areas such as locations where the mold cavity has a tortuous or multiangled configuration. It is also desirable that the finished article have a porosity and density compatible with various criteria dictated by the use to which the article is to be put. For example, the article should be of a low-bulk density and have a porous nature readily penetrable by plant root structure. Economic considerations call for an article of minimal density using the least amount of pulp. However, the article should have a density and consistency to provide firm physical support for the plant stem and plant roots and to maintain article integrity during normal use and handling. The molding apparatus of the present invention achieves the above desirable features as will become apparent hereinafter.

SUMMARY OF THE INVENTION

In forming molded pulp articles of the type adapted to be used as a soil substitute or plant growth medium, a forming mold having a cavity contoured to the configuration of the desired article is defined at least partially by a foraminous forming surface adaptable to effect suction deposition of pulp within the mold cavity. Dividing means within the mold cavity divides the later into subdivisions. The dividing means are shorter than the depth of said cavity so that the forming mold is operable to mold a plurality of planting units or blocks separated on one end and joined to one another by a common web of pulp material at the other end corresponding to a continuous, uninterrupted cavity section adjacent the foreshortened dividing means. The forming mold facilitates making a porous article of low-bulk density readily penetrable by plant root structure.

BRIEF DESCRIPTION OF THE DRAWINGS

FIG. 6 is a cross-sectional view similar to FIG. 5 but showing a compression plate in position partially in the mold cavity.

FIG. 7 is a partial plan view of the clamping plate on a larger scale than that shown in the prior figures.

FIG. 8 is a cross-sectional view looking substantially along the line 8—8 of FIG. 7.

FIG. 9 is an alternate embodiment showing in perspective a ribbed core pin.

FIG. 10 is a further alternate embodiment showing in perspective another type of ribbed core pin.

DESCRIPTION OF THE PREFERRED EMBODIMENTS

Figure 1:
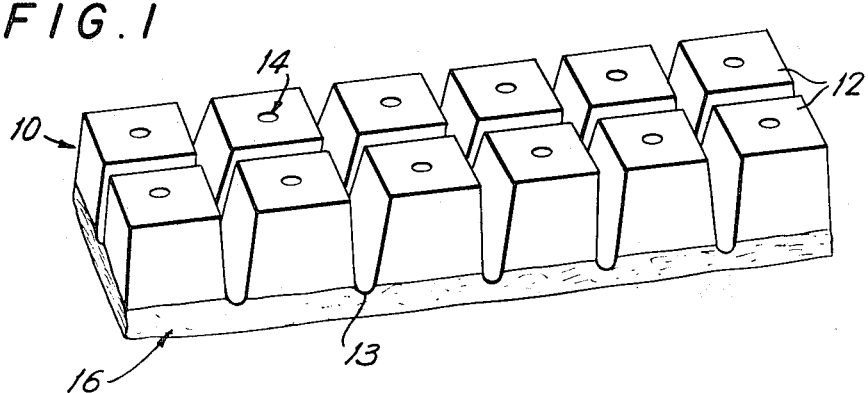
FIG. 1 is a perspective view of a multiunit cake of synthetic plant growth media molded with the molding apparatus shown in FIGS. 2 and 8.
Figure 2:
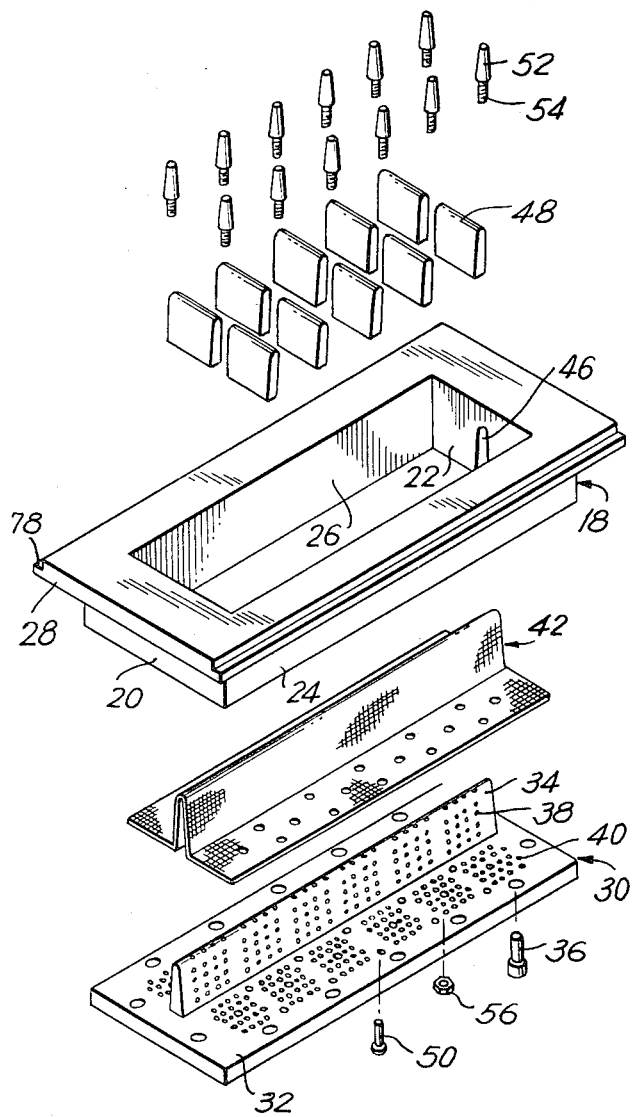
FIG. 2 is an exploded view of a molding apparatus according to one embodiment of the invention.
Figure 3:
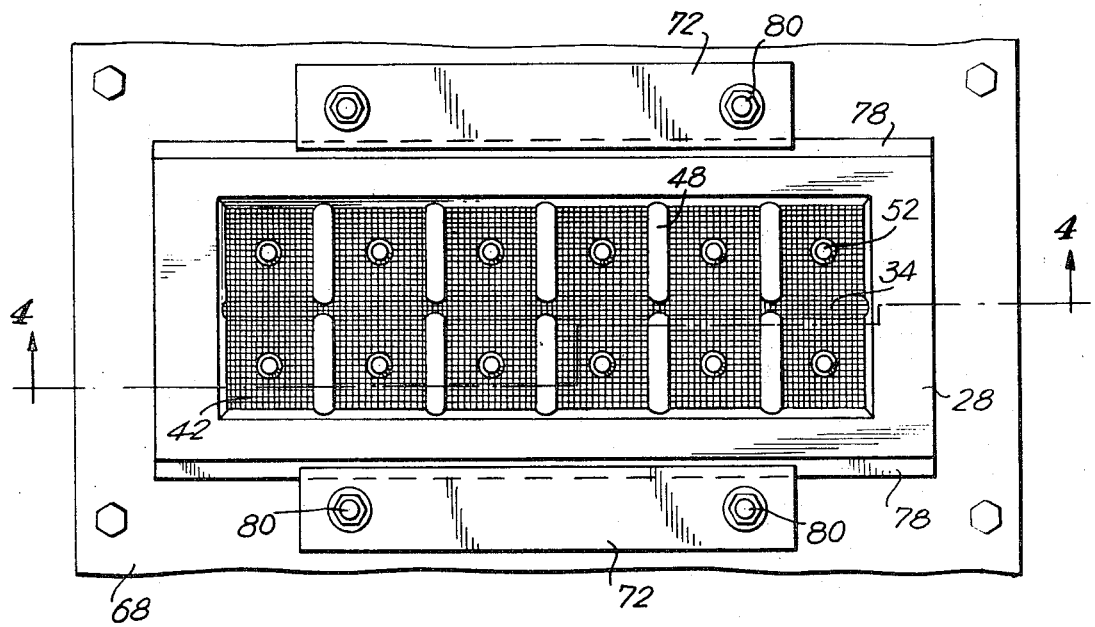
FIG. 3 is a plan view of the molding apparatus of FIG. 2 fully assembled.

FIG. 1 shows an article in the form of a multiunit cake 10 of synthetic growth media which is adapted to be molded from the molding apparatus hereinafter shown and described. The multiunit cake 10 consists of a plurality of planting units or blocks 12, each having a recess 14 therein for receiving a seed or plant cutting. The blocks 12 are joined together by readily severable bridging sections 13 formed as part of a continuous web 16, thereby enabling the multiunit cake 10 to be handled in one piece for starting plant growth during the growing period and then later severed into individual planting units or blocks 12 for repotting or field transplanting. The multiunit cake 10 is made from a synthetic growth medium, for example, polymer-modified wood cellulous fibers of the type disclosed in the aforementioned patent application. In the forming procedure, the individual fibers become intermeshed and intertangled with one another in a "brush-pile" configuration of low-bulk density and having a porous, spongy nature.

The mold for making the multiunit cake 10 comprises a mold body 18 having end walls 20, 22 and side walls 24, 26 defining a cavity open at two ends. A flange 28 circumscribes one of the open ends. A clamping plate 30 having a closure means or base 32 and an integral divider element or bar 34 extending generally perpendicularly from the base 32 is adapted to be secured to the unflanged open end of the mold body 18 by threaded fasteners 36. When the clamping plate 30 is secured in position, the divider bar 34 generally bisects the mold cavity. The base 32 and divider bar 34 each are provided with a plurality of ports 38 and 40, respectively, as will be further described, and a screen 42, contoured generally to the configuration of the clamping plate 30, is adapted to cover the aforesaid ports 38 and 40, thereby to define foraminous forming surfaces. The screen 42 is placed into close-fitting conformity with the clamping plate 30 before the latter is placed on the mold body 18 so that, after the clamping plate 30 is secured in place, the edges of the screen 42 will be sandwiched and held between the mold body 18 and the clamping plate 30. To this end, the side walls 24, 26 of the mold body 18 are each provided with longitudinally elongated notches 44 (FIG. 5) to accommodate the longitudinal edges of the screen 42 while still permitting an abutting joint between the mold body 18 and the clamping plate 30 immediately adjacent the notches 44. In addition, each end wall 20, 22 of the mold body 18 is provided with a cutout 46 to receive the longitudinal ends of the divider bar 34, said cutouts 46 conforming generally to the cross-sectional configuration of the divider bar 34 but being slightly larger than the latter to accommodate the edges of the screen 42 therebetween. It will be apparent that the screened divider bar 34 divides the mold cavity into two compartments.

Figure 4:
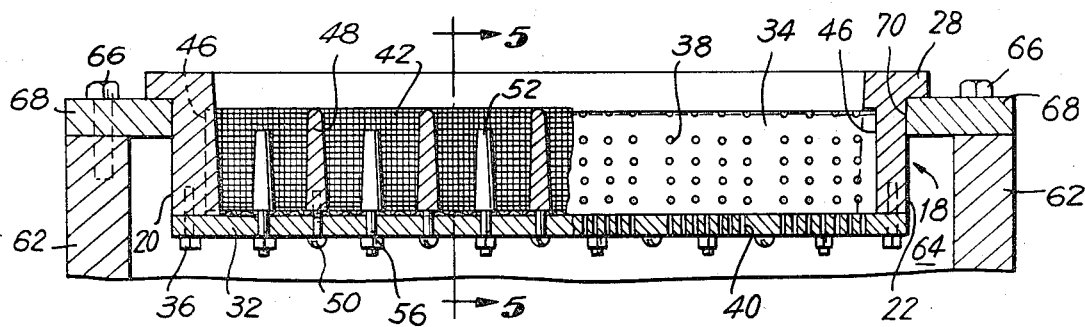
FIG. 4 is an elevational and partial cross-sectional view taken substantially along the line 4—4 of FIG. 3 with parts omitted for the purpose of illustration.

To further subdivide the mold cavity, a plurality of equally spaced divider plates 48 are disposed between the screened divider bar 34 and the side walls 24, 26 of the mold body 18. The divider plates 48 are fitted into assembled position after the screened clamping plate 30 has been placed in position on the mold body 18 and are secured in place by threaded fasteners 50 which extend through suitable openings in the screen 42 and the clamping-plate base 32 and which threadly engage the adjoining respective dividing plate 48 as is apparent in FIG. 4. Each divider plate 48 abuts the screened divider bar 34, the screened clamping-plate base 32, and the mold side walls 24 or 26, thereby to define a plurality of cavity subdivisions in which the aforementioned planting blocks 12 are adapted to be molded.

It will be noted each cavity subdivision has a truncated pyramidal configuration, thereby facilitating withdrawal of the molded article from the mold. Accordingly, the mold body side walls 24, 26 and end walls 20, 22 and the faces of the divider bar 34 and the divider plates 48 are all slightly tapered, as will be readily apparent from the drawings, with the smallest end of each truncated pyramidal subdivision being disposed adjacent the screened clamping-plate base 32. It will further be noted that the sides of each divider plate 48 are also tapered to fit snugly against the tapered, screened divider bar 34 and the tapered unscreened mold body side wall 24 or 26.

In order to form the aforementioned recesses 14 in each planting block 12, core pins 52 are centrally disposed in each cavity subdivision. Each core pin 52 has a threaded shank 54 which passes through a suitable opening in the screen 42 and clamping-plate base 32 to receive a nut 56 to secure it in position. It will be noted that the core pins 52 are tapered, thereby facilitating removal of the molded article from the core pins 52. The core pins 52 do not extend the full depth of the cavity subdivisions as will be apparent in FIG. 5.

The ports 38 and 40 in the divider's bar 34 and clamping-plate base 32, respectively, are spaced so that each cavity subdivision has its own set of ports suitably distributed thereabout. The divider-bar ports 38 are located on (and open onto, both divider-bar faces, and a plurality of spaced manifold passages 58 in the divider bar 52 are arranged so that a row of ports on either side of the divider bar 34 communicates with a common manifold passage 58 as will be readily evident in FIG. 5. Each manifold passage 58 extends through the base 32 of the clamping plate 30 and thereby is exposed to vacuum or pressurized conditions underlying the base plate 32 as will be further described. Each manifold passage 58 communicates with an end port 60 leading to and opening onto an arcuate surface defining the terminating end of the divider bar 34.

The ports 40 in the base plate 32 pass completely through the latter and open onto the underside of the base plate 32 where they, too, are exposed to vacuum or pressurized conditions underlying said base plate 32. The ports 40 in the clamping-plate base 32 may be countersunk, as shown at 61 in FIG. 8, to alleviate clogging and provide more uniform vacuum transmission.

Figure 5:
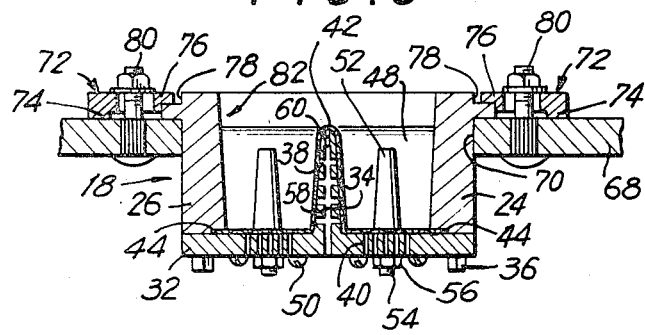
FIG. 5 is a cross-sectional view taken substantially along the line 5—5 of FIG. 4.

The mold thus far described is adapted to be mounted on a rotary wheel of a molding machine which carries a plurality of such molds through various operating stations as heretofore described. The molding machine comprises a frame part 62 (only partially shown) defining a manifold 64 (FIG. 4) which may be subjected to vacuum or pressurized conditions by means not shown. Mounted on the machine frame part 62 by the studs 66 is a support plate 68 having an opening 70 to receive the mold body 18. The aforementioned mold-body flange 28 abuts the edge portions of the opening 70 in the support plate 68, and the mold body 18 is secured in position in the opening 70 by two L-shaped clamps 72. Each clamp 72 has one leg 74 (FIG. 5) resting on the support plate 68 and the other leg 76, which is notched, mating with elongated notches 78 in the mold-body flange 28 as best shown in FIG. 5. Clamp bolts 80 securely hold the clamps 72 and mold body 18 in position. With the mold body 18 secured in place, as heretofore described, it will be apparent that the support-plate opening 70 is closed by the mold, and vacuum or pressure within the manifold 64 will be transmitted to the ports 38, 40, and 60 in the clamping plate 30.

It will be observed that the divider bar 34 and divider plates 48 do not extend the full height of the mold cavity, whereby a continuous, uninterrupted cavity section 82 is provided immediately above the aforemention cavity subdivisions. It will be apparent that the aforementioned web 16 of the molded article 10, previously described, is formed in the cavity section 82.

In operation, the mold is adapted to be immersed in a synthetic plant growth medium consisting of a slurry of fibers and a reduced pressure or vacuum applied to the molding machine manifold 64. This vacuum will be transmitted to the ports 38, 40, and 60 in the clamping plate 30, thereby to draw the slurry into the mold cavity. The liquid will be withdrawn through the ports 38, 40, and 60, and the fibers, which are prevented from being drawn off by the screen 42, are deposited in the mold cavity. It will be noted that the vacuum is drawn from two sides of each cavity subdivision, each disposed substantially at right angles to each other, i.e., the vacuum is drawn from the divider-bar ports 38 and from the clamping-plate base ports 40. This arrangement of ports tends to pull on the slurry in two directions at substantially right angles to one another, thereby establishing a multidirectional flow of the slurry and fibers and facilitating intertanglement of the fibers as they are molded into place. The multidirectional flow tends to avoid stratification (i.e., it avoids the condition where a large portion of the fibers lay substantially in one direction), such stratification being undesirable in that it tends to impair structural integrity because of the reduced degree of intertanglement.

After the mold is filled with fibers and removed from the batch of slurry supply, the fibers deposited in the mold cavity are subjected to compression by means of a compression plate 84 (FIG. 6). The compression plate 84 has a projecting part 86 of the same shape as, but slightly smaller than, the open end of the mold body 18 so that it can be pushed partially into the mold cavity to compress the fibers therein. The compression plate 84, which is bolted to a reciprocal mounted plate 88 (partially shown) at the pressing station of the molding machine, is adapted to enter the mold cavity only to a limited extent to leave a predetermined space between the end of the screened divider bar 34 and the projecting part 86 of the compression plate 84. Thus, the pressing operation does not interrupt the continuity of the cavity section 82 in which the web 16, which joins all the planting blocks 12 together, is formed.

After the article is compressed and the compression plate 84 withdrawn, the formed article may be dried by suitable means (not shown) and thereafter an extractor plate (not shown) applied to the article to withdraw the latter from the cavity mold. The extractor plate is identical to the compression plate 84 except that the extractor plate has ports in its projecting part. The extractor plate's projecting part is inserted partially into the mold cavity to the same position of the compression plate 84, as shown in FIG. 6, to engage the molded article. To remove the article from the mold, suction is applied (by means not shown) to the ports in the extractor plate and a positive pressure applied to the ports 38, 40, and 60 in the clamping plate 30 whereby the molded article 10 will affix itself to the extractor plate as the latter is withdrawn relative to the mold. Thereafter, the mold is ready to repeat the cycle as he molding machine is indexed to its next cycle.

The density of the mold article 10 is affected by various factors such as the type of fibers used, the concentration of fibers in the slurry, the degree of vacuum applied, the length of time which the mold is immersed in the slurry, and the arrangement and size of the vacuum ports. These factors can, of course, be controlled within limits as determined by practical and economic considerations to obtain the desired density and homogenity of the molded article. However, it has been found that the desired low-bulk density and porosity to facilitate root penetration is obtainable by arranging the vacuum ports on less than all sides of each cavity subdivision. Thus, the arrangement of ports on the divider bar 34 and base 32, as heretofore described, works toward providing the desired low-bulk density and, as previously described, the desired fiber intertanglement. It will be appreciated that the ports may also be arranged on other sides of the mold cavity subdivisions (e.g., in the walls of the cavity body 18), either in addition to or in lieu of the port 38 in the divider bar to obtain the desired results, depending on the prevailing conditions resulting from the other density-affecting factors heretofore mentioned. The aforedescribed arrangement of ports also provides suitable homogeneity of the pulp throughout each of the blocks 12 whereby void spaces, loosely or tightly packed spots or weak areas are avoided, and each block 12 will have substantially the same physical properties as to density, porosity, weight and dimension so as to promote uniform plant growth in all the blocks 12 of the article 10.

The aforementioned thin, connecting bridges 13 in the molded article 10 between individual planting blocks 12 hold the latter together during normal handling of the article 10, but the bridges also provide readily severable tear areas to facilitate separation of the individual planting blocks 12 at a later time as previously described. It is desirable to mold the proper density and intertanglement of the fibers in the bridging area to obtain the desired integrity to meet the aforesaid criteria. Accordingly, the end ports 60, opening to the end of the divider bar 34, facilitate drawing in sufficient intertangled fibers at this critical area and thereby avoid stratification and looseness. The pressing operation by the compression plate 84 acting directly on the cavity section 82 tends to compact the fibers in the cavity section 82, thereby enhancing the integrity and strength of the web 16 where it is most desirable in that the web 16 serves as the main structural support for the entire article 10. Since the pulp material is somewhat spongy, the compressive action is less effective on the pulp material in the depths of the cavity subdivisions so that the desired low-bulk density and porosity is not impaired.

It will be appreciated that it is a simple matter to change the sizes of the core pins 52 in the mold to provide different sizes and/or configurations of recesses 14 in the molded article 10. For example, if an article being molded is to be used for rooting poinsettia cuttings, it might be desirable to have one size of core pin 52 which is most adaptable to the range of sizes most frequently encountered with stems of poinsettia cuttings whereas, should it be desired to plant geranium cuttings, it might be preferable to use a different-size core pin 52 to form a larger recess 14 to accommodate the larger-size stems ordinarily encountered with geranium plants.

As an alternate embodiment, the core pins may be fluted, as shown at 90 in FIG. 9, by providing a plurality of riblike projections 92 in the tapered side walls of the core pin. The indentations 94 between the projections 92 form riblike projections in the recess 14 which tend to maximize the range of cutting sizes and configurations which can be accommodated in a particular-size recess as described in greater detail in copending application Ser. No. 667,758, filed Sept. 14, 1967. As shown in FIG. 9, the indentations 94 have a constant depth along their longitudinal length. As a further alternate embodiment, core pins 96 (FIG. 10) having projecting ribs 98 with a cross-sectional configuration similar to that of a spur gear may be used. This arrangement facilitates the manufacture of the core pins 96 in that the latter may be economically and readily manufactured with a conventional gear-cutting machine. The gearlike ribs 98 may be formed from a frusto-conical blank so that such ribs 98 are tapered. The indentations 99 between the ribs 98 may also have a longitudinally tapered configuration by feeding the cutting tool, which cuts the indentations 99, along a path parallel to the longitudinal axis of the core pin 96.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the forms hereinbefore described being merely preferred embodiments thereof.

What is claimed is:

1. Apparatus for forming a molded pulp article of the type adapted to be used as a soil substitute or plant growth media, comprising mold means having a cavity contoured generally to the configuration of the desired article, said mold means comprising a body mold having side walls defining the side walls of said article, said mold means further comprising a bottom closure element fixed to said body mold and defining the bottom wall of said article, longitudinal and transverse dividing members mounted on said bottom closure element and extending from the latter into said cavity to divide said cavity into a plurality of subdivisions, each of said cavity subdivisions being defined by a portion of said bottom closure element and by at least one dividing member, said bottom closure element and said longitudinal dividing member having foraminous surfaces to which vacuum is adapted to be applied, said dividing members being shorter than the depth of said cavity, whereby the forming mold is operable to mold a plurality of planting units separated at one end and joined to one another by a common web of pulp material at the other end corresponding to a continuous section in said mold cavity adjacent said forshortened dividing members.

2. Apparatus for forming molded pulp articles according to claim 1 wherein said mold body is constructed and arranged to receive a compression plate in the open end of the mold cavity to compress the fibers in the latter without interrupting the continuity of said cavity section.

3. Apparatus for forming molded pulp articles according to claim 1 constructed and arranged whereby said foraminous surfaces cooperating with nonforaminous surfaces imparts a multidirectional flow to the pulp fibers.

4. Apparatus for forming molded pulp articles according to claim 3 wherein said longitudinal dividing member and said bottom closure element have a plurality of vacuum ports, and a screen covering said vacuum ports.

5. Apparatus for forming molded pulp articles according to claim 1 wherein said longitudinal dividing member has ports on its terminating end opening into said continuous cavity section, said longitudinal dividing member also having groups of ports on both sides thereof with each group of ports on either side communicating with a common manifold passage, said manifold passage also communicating with said end ports in the terminating end of said longitudinal dividing member where the said continuous cavity section bridges said cavity subdivisions.

6. Apparatus for forming molded pulp articles according to claim 1 wherein said transverse dividing member and said side walls of said body mold are imperforate.

7. Apparatus for forming molded pulp articles according to claim 1 wherein said forming mold means carries a plurality of core elements projecting into said cavity subdivisions, thereby to provide recesses in the planting units of the molded article.

8. Apparatus for forming molded pulp articles according to claim 7 further comprising means detachably securing said core elements to said forming mold means to facilitate changing the size of the core elements depending on the type or size recess desired in particular planting units.

9. Apparatus for forming molded pulp articles according to claim 7 wherein said core elements are provided with ribs.

References Cited

UNITED STATES PATENTS

| | | | |
|---|---|---|---|
| 2,619,702 | 12/1952 | Blackburn et al. | 249—141X |
| 2,718,826 | 9/1955 | Lambert | 249—113 |
| 2,903,062 | 9/1959 | Lambert | 249—113 |
| 3,185,615 | 5/1965 | Reifers | 162—228 |

FOREIGN PATENTS

| | | | |
|---|---|---|---|
| 52,678 | 12/1934 | Denmark | 162—411 |

REUBEN FRIEDMAN, Primary Examiner

T. A. GRANGER, Assistant Examiner

U.S. Cl. X.R.

162—411